United States Patent
Fallone

(10) Patent No.: US 8,599,510 B1
(45) Date of Patent: Dec. 3, 2013

(54) DISK DRIVE ADJUSTING DATA TRACK DENSITY BASED ON WRITE CONDITION WHEN WRITING TO CONTIGUOUS DATA TRACKS

(75) Inventor: Robert M. Fallone, Newport Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 232 days.

(21) Appl. No.: 13/101,005

(22) Filed: May 4, 2011

(51) Int. Cl.
  *G11B 5/02* (2006.01)
  *G11B 27/36* (2006.01)

(52) U.S. Cl.
  USPC .............. 360/48; 360/31; 360/55; 360/78.08

(58) Field of Classification Search
  USPC ................................ 360/55–68, 75–78.15, 48
  See application file for complete search history.

(56) References Cited

U.S. PATENT DOCUMENTS

| | | | |
|---|---|---|---|
| 4,945,427 A | 7/1990 | Cunningham | |
| 6,493,176 B1* | 12/2002 | Deng et al. | 360/78.05 |
| 7,012,771 B1* | 3/2006 | Asgari et al. | 360/31 |
| 7,276,874 B2* | 10/2007 | Aoki et al. | 360/75 |
| 7,408,731 B2 | 8/2008 | Uemura et al. | |
| 7,589,925 B1* | 9/2009 | Chiao et al. | 360/48 |
| 7,620,772 B1 | 11/2009 | Liikanen et al. | |
| 7,685,360 B1 | 3/2010 | Brunnett et al. | |
| 7,688,540 B1 | 3/2010 | Mei et al. | |
| 7,733,589 B2 | 6/2010 | Wada et al. | |
| 7,872,822 B1 | 1/2011 | Rothberg | |
| 7,916,421 B1* | 3/2011 | Liikanen et al. | 360/77.01 |
| 2001/0043418 A1* | 11/2001 | Nishida et al. | 360/55 |
| 2004/0193798 A1 | 9/2004 | Kuwamura | |
| 2006/0227445 A1 | 10/2006 | Chiao et al. | |
| 2007/0223132 A1 | 9/2007 | Tsuchinaga | |
| 2007/0291399 A1* | 12/2007 | Kamimura et al. | 360/75 |
| 2009/0002872 A1 | 1/2009 | Ueda et al. | |
| 2010/0142087 A1 | 6/2010 | Carson | |

\* cited by examiner

*Primary Examiner* — Nathan Danielsen

(57) ABSTRACT

A disk drive is disclosed comprising a head actuated over a disk including a plurality of contiguous servo tracks for defining a plurality of data tracks. A first write command comprising first write data is received, and a first density of first data tracks over a first plurality of the contiguous servo tracks is selected, wherein the first write data is written to the first data tracks. A second write command comprising second write data is received, and a second density of second data tracks over the first plurality of the contiguous servo tracks is selected, wherein the second density is different than the first density. The second write data is written to the second data tracks.

26 Claims, 5 Drawing Sheets

DISK DRIVE ADJUSTING DATA TRACK DENSITY BASED ON WRITE CONDITION WHEN WRITING TO CONTIGUOUS DATA TRACKS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 2 comprising a plurality of data tracks 4 defined by a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

The data sectors are accessed indirectly using logical block addresses (LBAs) mapped to physical block addresses (PBAs) representing the physical location of each data sector. This indirect accessing facilitates mapping out defective data sectors during manufacturing as well as while the disk drive is deployed in the field. Access commands (read/write) received from the host include LBAs which the disk drive maps to corresponding PBAs using any suitable mapping technique.

The LBA to PBA mapping may also facilitate a log structured file system wherein at least part of the disk is written as a circular buffer. For example, the circular buffer may be written from an outer diameter track toward an inner diameter track, and then circle back to the outer diameter track. Data is written to the head of the circular buffer such that the LBAs of new write commands are mapped to the PBAs of the corresponding data sectors. When the same LBA is written by the host, the data is written to a new PBA at the head of the circular buffer and the old PBA is marked invalid so that it may be overwritten. During a garbage collection operation, valid PBAs previously written in the circular buffer may be relocated to the head of the circular buffer so that the old PBAs may be overwritten.

DETAILED DESCRIPTION OF EMBODIMENTS OF THE INVENTION

Figure 1:
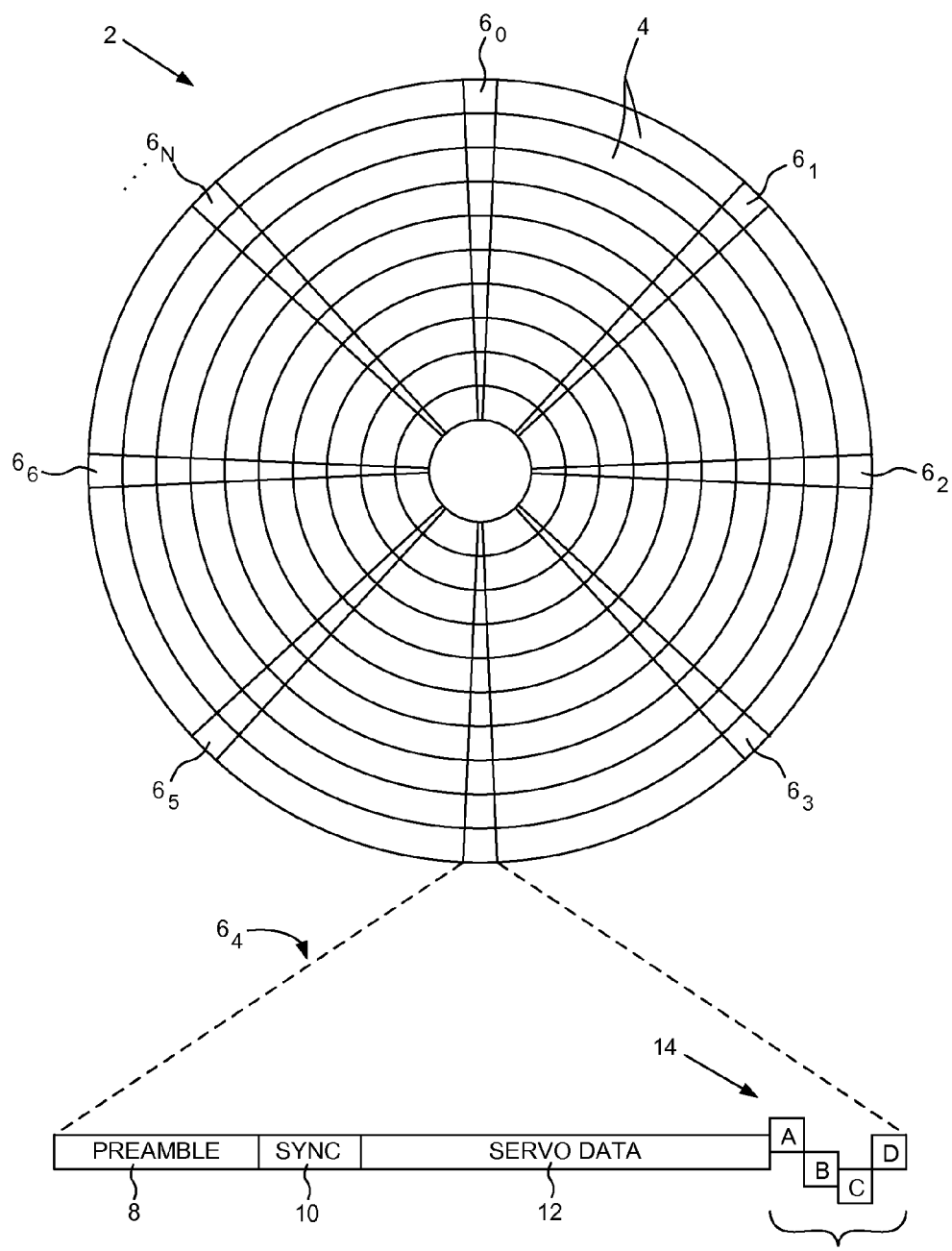
FIG. 1 shows a prior art disk format comprising a plurality of tracks defined by embedded servo sectors.
Figures 2A, 2B, 2C:
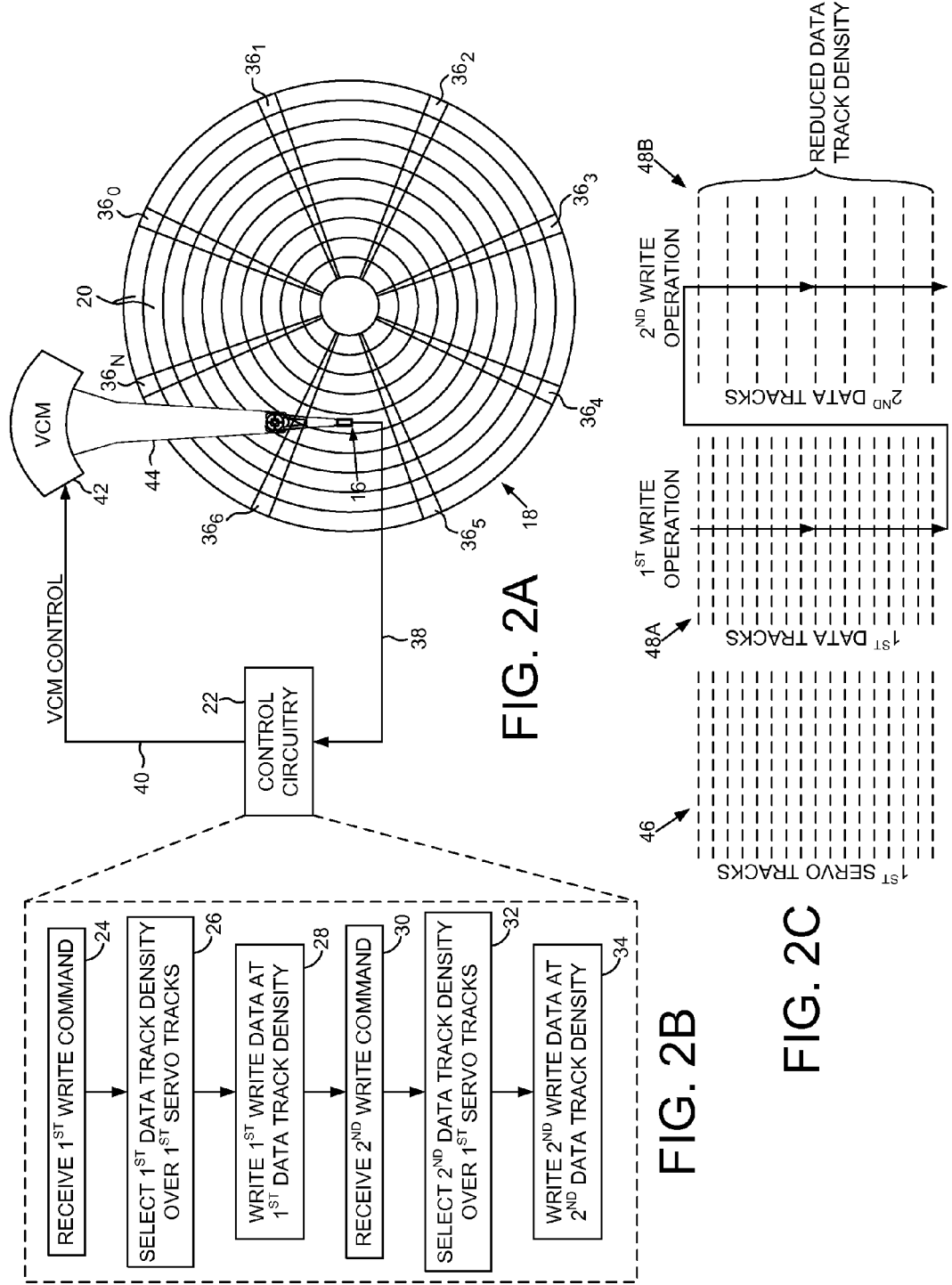
FIG. 2A shows a disk drive according to an embodiment of the present invention comprising a head actuated over a disk.
FIG. 2B is a flow diagram according to an embodiment of the present invention wherein data is first written to data tracks defined over a plurality of servo sectors at a first data track density, and then data is second written to data tracks defined over the same plurality of servo sectors at a second data track density.
FIG. 2C illustrates an example embodiment of the present invention.

FIG. 2A shows a disk drive according to an embodiment of the present invention comprising a head 16 actuated over a disk 18 including a plurality of contiguous servo tracks 20 for defining a plurality of data tracks. The disk drive further comprises control circuitry 22 operable to execute the flow diagram of FIG. 2B, wherein a first write command comprising first write data is received (step 24), and a first density of first data tracks over a first plurality of the contiguous servo tracks is selected (step 26), wherein the first write data is written to the first data tracks (step 28). A second write command comprising second write data is received (step 30), and a second density of second data tracks over the first plurality of the contiguous servo tracks is selected (step 32), wherein the second density is different than the first density. The second write data is written to the second data tracks (step 34).

The disk 18 shown in the embodiment of FIG. 2A comprises a plurality of servo sectors $36_0$-$36_N$ that define servo tracks 20, wherein data tracks are defined relative to the servo tracks 20. The control circuitry 22 processes a read signal 38 emanating from the head 16 to demodulate the servo sectors $36_0$-$36_N$ into a position error signal (PES) representing a position error of the head relative to a target data track. The control circuitry 22 comprises a servo compensator for filtering the PES to generate a control signal 40 applied to a voice coil motor (VCM) 42 that rotates an actuator arm 44 about a pivot in order to actuate the head 16 radially over the disk 18 in a direction that reduces the PES.

Each data track is partitioned into a number of data sectors, and a write command identifies a number of logical block addresses (LBAs) that are mapped to physical block addresses (PBAs) of corresponding data sectors. In the embodiments of the present invention, at least a portion of the disk 18 and corresponding servo tracks 20 are used to implement dynamic LBA mapping. With dynamic LBA mapping, the write data is written to the head of a circular buffer defined by contiguous data tracks, and the LBAs are mapped to the corresponding PBAs of the data sectors at the head of the circular buffer. Eventually the head of the circular buffer wraps around and begins overwriting the tail of the circular buffer (valid data sectors at the tail of the circular buffer may be relocated to the head of the circular buffer during a garbage collection operation). In the embodiments of the present invention, the data track density may be dynamically adjusted when overwriting the contiguous data tracks within the circular buffer.

FIG. 2C illustrates an example of dynamically adjusting the data track density according to an embodiment of the present invention wherein a plurality of contiguous servo tracks 46 are used to define a plurality of data tracks. During a first write operation, first data tracks 48A are written at a first data track density, and during a second write operation, second data tracks 48B are written at a second (lower) track density (i.e., the second data tracks 48B overwrite the first data tracks 48A at a lower data track density). In the example of FIG. 2C, the contiguous servo tracks 46 may represent the entire circular buffer or a portion of the circular buffer. In one embodiment, the data track density may be dynamically adjusted multiple times over the length of the circular buffer.

Figure 3A:
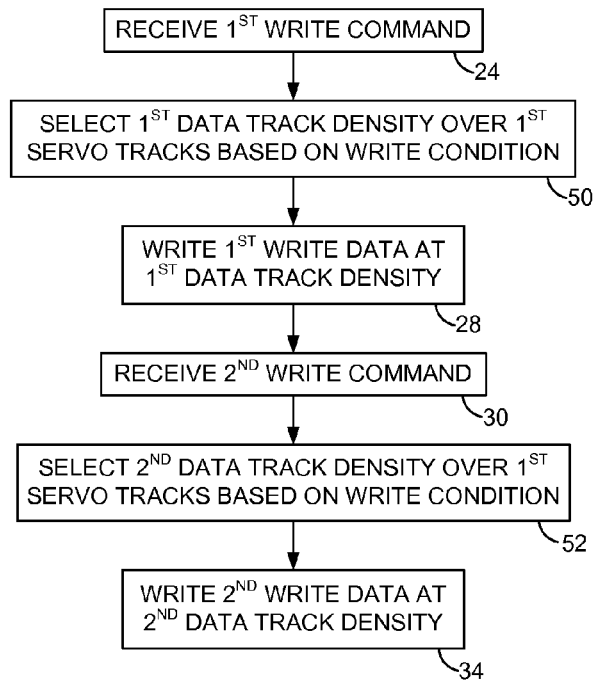
FIG. 3A is a flow diagram according to an embodiment of the present invention wherein the data track density is selected based on a write condition.

The data track density may be adjusted for any suitable reason in the embodiments of the present invention. FIG. 3A is a flow diagram according to an embodiment of the present invention wherein when the first write command is received (step 24), the first data track density is selected based on a suitable write condition (step 50), and when the second write command is received (step 30), the second data track density is selected based on the write condition (step 52).

Figure 3B:
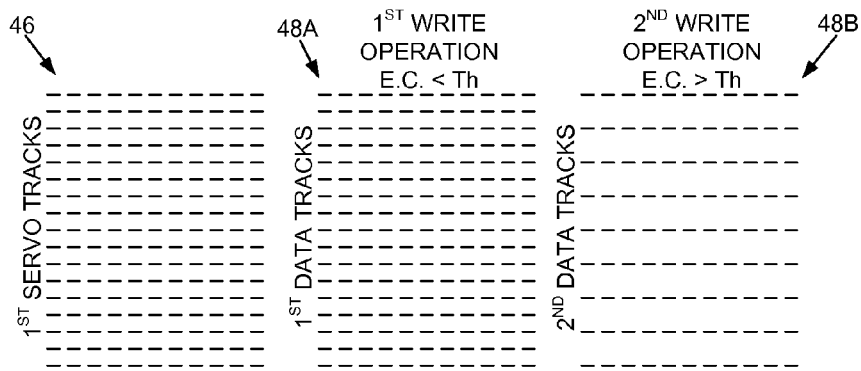
FIG. 3B illustrates an embodiment of the present invention wherein the write condition that determines the data track density comprises an environmental condition (e.g., vibration, temperature, etc.).

Any suitable write condition may be evaluated in order to select the data track density, wherein FIG. 3B shows an embodiment where the write condition comprises an environmental condition (E.C.), such as vibration or temperature condition. For example, if a detected vibration or temperature exceeds a threshold, the data track density may be decreased as illustrated by the second write operation in FIG. 3B. In this manner, the deleterious effect an environmental condition may have on a write operation (e.g., off-track write, under saturation, etc.) is ameliorated by decreasing the data track density. When the environmental condition subsides (e.g., reduction in vibration or temperature), the data track density may be increased to increase the capacity of the circular buffer.

Figure 3C:
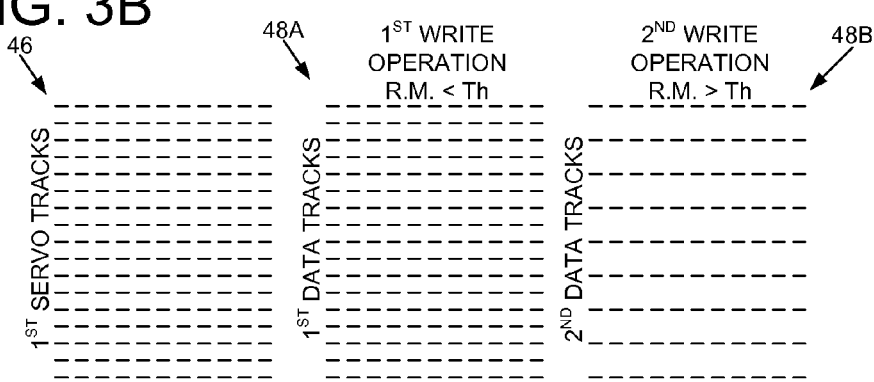
FIG. 3C illustrates an embodiment of the present invention wherein the write condition that determines the data track density comprises a reliability metric of the data being written.

FIG. 3C shows an embodiment of the present invention wherein the write condition comprises a reliability metric (R.M.) assigned to the write data. For example, the write data included in a write command may include a reliability metric, wherein the reliability metric identifies a significance of the write data. More significant data (e.g., operating system data, application data, etc.) may be given a higher reliability metric than less significant data (e.g., audio data, video data, etc.). When the reliability metric of the write data exceeds a threshold, the data track density is decreased as illustrated in FIG. 3C. This improves the chances of successfully reading back the written data since a lower data track density reduces errors caused by adjacent track interference, off-track writes, etc.

Figure 4:
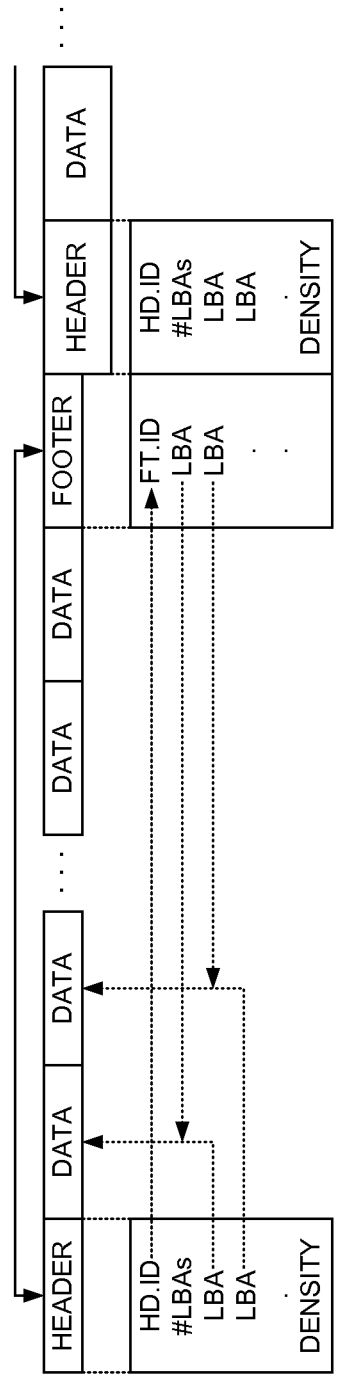
FIG. 4 illustrates an embodiment of the present invention wherein metadata is written inline with the write data, wherein the metadata identifies logical block addresses (LBAs) assigned to the write data together with a data track density of the written data tracks.

FIG. 4 illustrates an embodiment of the present invention wherein metadata is written inline with the write data. In the example shown, the metadata comprises a header data sector, followed by a number of contiguous data sectors that may span a partial data track or multiple data tracks, and ending with a footer data sector. The header data sector comprises a header identifier (ID), a number of LBAs written, the LBA for each data sector written, and the data track density that the following data sectors are written. The footer data sector comprises a footer ID corresponding to the header ID, and a copy of the LBAs which provides redundancy to help ensure the correct LBAs are read. The footer data sector also helps protect against a power failure interrupting a write operation. That is, if the footer data sector is not detected, it means the write operation was likely interrupted by a power failure.

In one embodiment, the control circuitry 22 maintains a LBA to PBA translation table that is updated during write operations and then periodically saved to a non-volatile memory (e.g., on the disk or in a non-volatile semiconductor memory). The LBA to PBA translation table is referenced during a read operation in order to determine the physical location on the disk the data is written. In one embodiment, the LBA to PBA translation table includes mapping information that accounts for changes to the data track density that may occur over time. For example, each entry in the LBA to PBA translation table may include a servo track number and offsets (circumferential and radial) that account for the varying data track density. In one embodiment, the LBA to PBA translation table may also comprise a reliability metric for the written data so that the data may be re-written at the desired data track density when executing a garbage connection operation (when valid data sectors are relocated to the head of the circular buffer).

In one embodiment, the data tracks may be read without referencing the LBA to PBA translation table. For example, if a power failure occurs the LBA to PBA translation table may need to be reconstructed up to the point it was last saved prior to the power failure. In another embodiment, the data tracks may be read in a consecutive sequence during the garbage collection operation. In these embodiments, the data track density field in the header data sector of the inline metadata is read in order to determine where to position the head while reading the following data sectors. In the example shown in FIG. 4, a first sequence of LBAs are written at a first data track density, followed by a second sequence of LBAs written at a second data track density that is half the first data track density (e.g., due to an excessive vibration at the time of the second write operation). In one embodiment, the transition in data track density may occur in the middle of a data track, and in another embodiment the transition may occur at a data track boundary. In either case, the header data sector may be difficult to read when there is a transition in data track density (such as the second header data sector shown on FIG. 4).

If the header data sector cannot be recovered by positioning the head at the data track density of the previous write operation, a suitable technique may be employed to estimate the offset from the centerline of the new data track (e.g., by evaluating an amplitude of the read signal). A retry operation may then be executed using the estimated offset in an attempt to recover the header data sector, where the head may be positioned first toward the inner diameter of the disk by the estimated offset, and then toward the outer diameter of the disk by the estimated offset (if necessary). Once the header data sector is recovered, the head can be positioned over the centerline of the remaining data tracks for the current and subsequent write operations (until the data track density changes again).

Figure 5A:
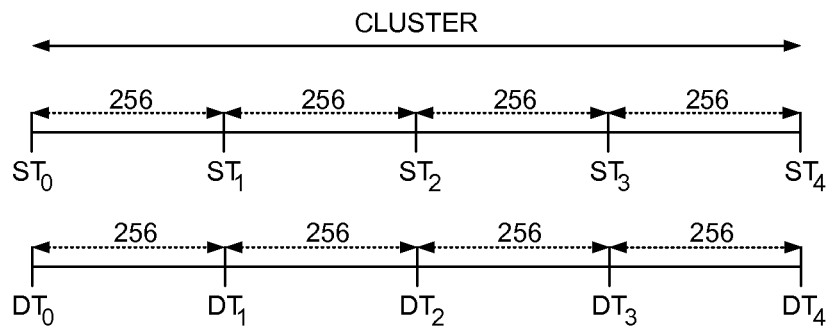
FIGS. 5A-5C illustrate embodiments of the present invention for adjusting the data track density relative to servo tracks.
Figure 5B:
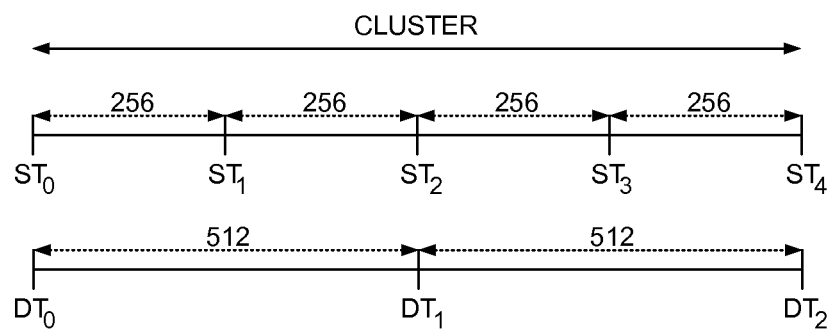
Figure 5C:
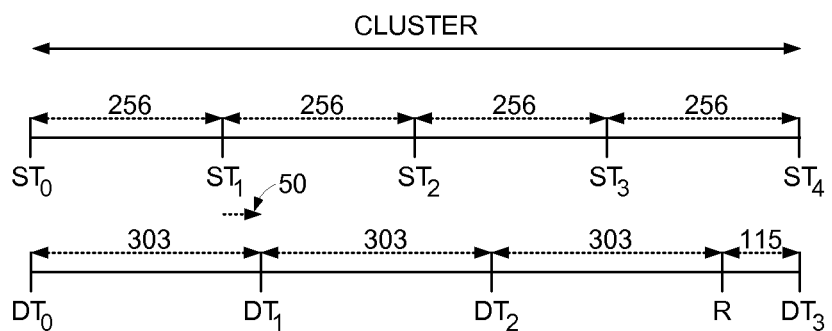

Any suitable technique may be employed to vary the data track density in the embodiments of the present invention, and in one embodiment, the data track density may be varied relative to a servo track density. FIGS. 5A-5C illustrate an embodiment of the present invention wherein four contiguous servo tracks define a cluster. More information regarding clusters is disclosed in U.S. Pat. No. 7,872,822 entitled "DISK DRIVE REFRESHING ZONES BASED ON SERPENTINE ACCESS OF DISK SURFACES", the disclosure of which is incorporated herein by reference. In FIGS. 5A-5C, the head may be positioned between the centerline of the servo tracks at one of 256 offsets (i.e., the centerline of a data track may be defined at one of 256 offsets relative to a servo track). In FIG. 5A, the centerline of a data track is aligned with a centerline of a servo track (offset of zero) so that the data track density is four data tracks per cluster. In FIG. 5B, the data track density is decreased by half so that the data track density is two data tracks per cluster. In FIG. 5C, the data track density is defined to be three data tracks per cluster by defining an offset relative to the servo tracks (e.g., data track $DT_1$ defined at an offset 50 relative to servo track $ST_1$). Accordingly, the change in the data track density may be an integer multiple (e.g., FIG. 5A comprises twice the data track density of FIG. 5B), or the change may be a fractional multiple (e.g., FIG. 5A comprises 4/3 the data track density of FIG. 5C). In the example shown in FIG. 5C, there is a remainder of 115 servo steps added to the spacing of the last data track of the cluster so that the relationship of data tracks to servo tracks remains constant across the clusters.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of contiguous servo tracks for defining a plurality of data tracks;
   a head actuated over the disk; and
   control circuitry operable to:
      receive a first write command comprising first write data;
      select a first track density of first data tracks over a first plurality of the contiguous servo tracks;
      write the first write data to the first data tracks;
      receive a second write command comprising second write data;
      select a second track density of second data tracks over the first plurality of the contiguous servo tracks, wherein the second track density is different than the first track density; and
      write the second write data to the second data tracks.

2. The disk drive as recited in claim 1, wherein the control circuitry is further operable to select the first and second track density based on a write condition.

3. The disk drive as recited in claim 2, wherein the write condition comprises an environmental condition.

4. The disk drive as recited in claim 3, wherein the environmental condition comprises a vibration condition.

5. The disk drive as recited in claim 4, wherein the control circuitry is further operable to select a lower track density of data tracks when the vibration condition exceeds a threshold.

6. The disk drive as recited in claim 3, wherein the environmental condition comprises a temperature condition.

7. The disk drive as recited in claim 6, wherein the control circuitry is further operable to select a lower track density of data tracks when the temperature condition exceeds a threshold.

8. The disk drive as recited in claim 2, wherein the write condition comprises a reliability metric assigned to the write data.

9. The disk drive as recited in claim 8, wherein the control circuitry is further operable to select a lower track density of data tracks when the reliability metric exceeds a threshold.

10. The disk drive as recited in claim 1, wherein:
    the control circuitry is further operable to write metadata inline with the first write data; and
    the metadata identifies logical block addresses (LBAs) assigned to the first write data.

11. The disk drive as recited in claim 10, wherein the metadata identifies the first track density of the first data tracks.

12. The disk drive as recited in claim 1, wherein the second track density is an integer multiple of the first track density.

13. The disk drive as recited in claim 1, wherein the second track density is a fractional multiple of the first track density.

14. A method of operating a disk drive, the disk drive comprising a head actuated over a disk comprising a plurality of contiguous servo tracks for defining a plurality of data tracks, the method comprising:
    receiving a first write command comprising first write data;
    selecting a first track density of first data tracks over a first plurality of the contiguous servo tracks;
    writing the first write data to the first data tracks;
    receiving a second write command comprising second write data;
    selecting a second track density of second data tracks over the first plurality of the contiguous servo tracks, wherein the second track density is different than the first track density; and
    writing the second write data to the second data tracks.

15. The method as recited in claim 14, further comprising selecting the first and second track density based on a write condition.

16. The method as recited in claim 15, wherein the write condition comprises an environmental condition.

17. The method as recited in claim 16, wherein the environmental condition comprises a vibration condition.

18. The method as recited in claim 17, further comprising selecting a lower track density of data tracks when the vibration condition exceeds a threshold.

19. The method as recited in claim 16, wherein the environmental condition comprises a temperature condition.

20. The method as recited in claim 19, further comprising selecting a lower track density of data tracks when the temperature condition exceeds a threshold.

21. The method as recited in claim 15, wherein the write condition comprises a reliability metric assigned to the write data.

22. The method as recited in claim 21, further comprising selecting a lower track density of data tracks when the reliability metric exceeds a threshold.

23. The method as recited in claim 14, further comprising writing metadata inline with the first write data, wherein the metadata identifies logical block addresses (LBAs) assigned to the first write data.

24. The method as recited in claim 23, wherein the metadata identifies the first track density of the first data tracks.

25. The method as recited in claim 14, wherein the second track density is an integer multiple of the first track density.

26. The method as recited in claim 14, wherein the second track density is a fractional multiple of the first track density.

* * * * *